Figure 1:
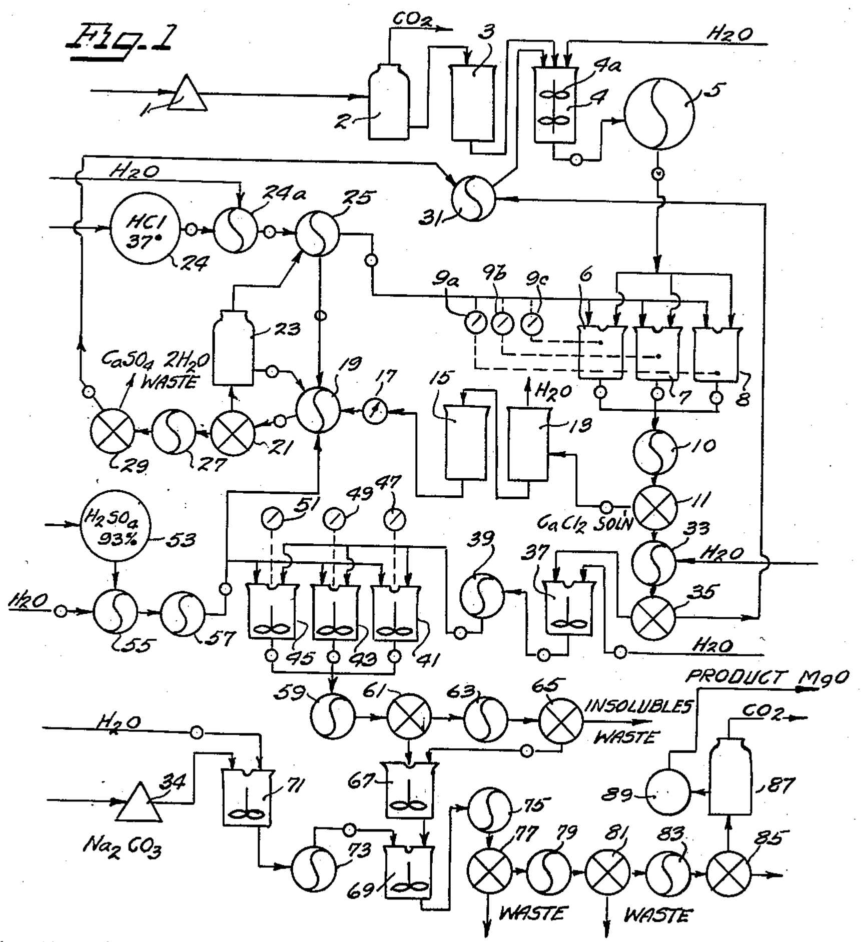

RECOVERY OF MAGNESIA

Filed June 19, 1961

Inventor
WILLIAM L NIKOLAI
By Soans, Anderson, Luedeka & Fitch
Attys

United States Patent Office 3,116,974
Patented Jan. 7, 1964

3,116,974
RECOVERY OF MAGNESIA
William L. Nikolai, Box 19, Rte. 4, Platteville, Wis.
Filed June 19, 1961, Ser. No. 118,034
8 Claims. (Cl. 23—201)

The present invention relates to the recovery of magnesia, and more particularly, it relates to a process for the efficient separation of magnesium and calcium compounds in mineral masses with the recovery of the magnesium as purified magnesia.

Various processes are known for the recovery of magnesium in the form of magnesia, that is magnesium oxide, MgO, from calcium- and magnesium-containing mineral masses previously untreated, such as dolomitic material, or material obtained from various mineral recovery processes, as for example, the float tails from zinc-lead recovery processes. Various procedures have been suggested for separating the magnesium compounds from the calcium compounds, and also from the remaining constituents of the mineral mass. However, since magnesium is in many respects chemically similar to calcium, efficient separation of magnesium from calcium is difficult to accomplish.

Conventional magnesia recovery processes require an accurate initial assay of the starting material and knowledge of the concentration of the reagents to be utilized, in order to avoid complications during the separation process, i.e., to assure the recovery of magnesia of sufficient purity and yield to be commercially feasible. Such processes generally require rigid analytical controls. Such assays as are required are time-consuming and expensive.

Moreover, problems arise in conventional processing in that the starting materials, such as the dolomitic materials, may vary considerably in assay from lot to lot and even from portion to portion throughout a particular lot. Accordingly, it is sometimes difficult to assure the use of correct amounts of recovery reagents in order to obtain the desired results.

There is a need to provide a process for economically recovering magnesium from magnesium- and calcium-containing mineral masses, in a manner which would not necessitate an accurate initial assay of the starting materials nor accurate knowledge of concentrations of reagents.

Such a process has now been discovered. The discovered process is economical and efficient. It is capable of effecting substantially complete separation of magnesium from calcium and other metals. This process does not require accurate knowledge by assay or otherwise of the exact constituents of the starting material, nor does it require accurate knowledge of the precise amounts and concentrations of the reagents to be used during the process. Rigid analytical controls before and during processing are substantially obviated, with consequent savings in time and expense.

Accordingly, it is a principal object of the present invention to provide an improved process for the recovery of magnesium compounds from mineral masses containing both magnesium and calcium compounds. It is also an object of the present invention to provide an economical process for the recovery of magnesia from mineral masses containing calcium compounds. It is a further object of the present invention to provide a process for the substantially complete recovery of purified magnesium oxide from a mineral mass containing both magnesium and calcium, which process does not require an accurate assay of the starting material, nor accurate information concerning the exact concentrations and amounts of reagents, etc. It is a still further object of the present invention to provide an improved process for separately recovering both purified magnesia and calcium compounds from a mineral mass.

Figure 2:
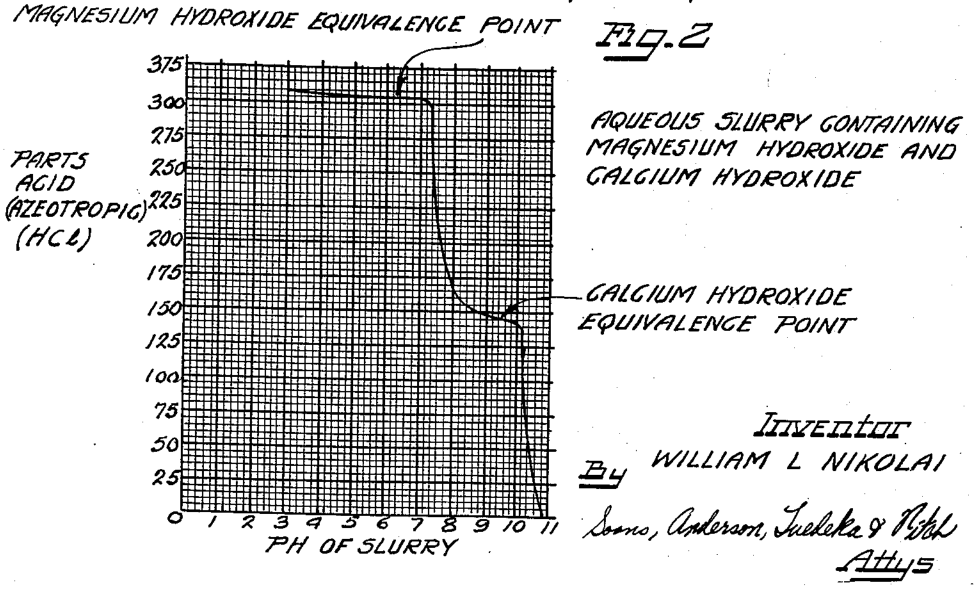

Further objects and advantages of the present invention will be apparent from a study of the following detailed description, and the accompanying drawings of which:

FIGURE 1 is a schematic flow diagram of one embodiment of the process of the present invention; and FIGURE 2 is a graph depicting the rate of change in pH values upon addition of acid to an aqueous slurry containing magnesium hydroxide and calcium hydroxide.

The present process comprises an improved method for effectively first separating calcium salts from a calcium- and magnesium-containing mineral mass and thereafter effectively separating magnesia from the remaining mass.

More particularly, the present process comprises (*a*) forming a slurry of calcium hydroxide and magnesium hydroxide from a mineral mass, (*b*) selectively solubilizing the calcium hydroxide with an acid to form a water-soluble calcium salt, without substantially solubilizing the magnesium hydroxide, (*c*) selectively reacting the magnesium hydroxide with acid to form a water-soluble product, and (*d*) converting the magnesium compound to magnesia.

The selective solubilization of calcium hydroxide in the slurry is effected with controlled amounts of acid being added to reduce the pH of the slurry from an initial pH in excess of about 10 down to a point, referred to hereinafter as the equivalence point, where the calcium hydroxide is substantially completely solubilized. It has now been found that this equivalence point can be readily determined by measurement of the pH value in the slurry. When acid is continuously added to the calcium hydroxide-containing slurry, there is at first a gradual decrease in pH per unit of acid added to the slurry. But as the equivalence point is approached, the pH rapidly decreases per unit of acid added. I have found that the equivalence point exists at pH values in the range of about 8.5 to about 10.0. Beyond the equivalence point, i.e., when the pH is lower than that at the equivalence point, the rate of decrease of pH per unit of acid added again is again gradual. When the equivalence point is reached, the solubilization of calcium hydroxide is substantially completed, and the calcium is, therefore, in soluble salt form, that is, is in aqueous solution in the slurry. The calcium is then easily removed from the magnesium hydroxide, which is still insoluble, and other insolubles by separating the aqueous solution from the slurry solids. The equivalence point should not be exceeded until the solubilized calcium is removed, since if the pH is reduced below the equivalence point, magnesium hydroxide will react with the acid.

The solids remaining after separation are slurried with a further amount of water, and the magnesium hydroxide therein is solubilized by adding acid. The method of contacting the acid with the magnesium hydroxide may be similar to that employed with respect to the contacting of acid and calcium hydroxide. In this connection, the acid may be introduced into the slurry in controlled amounts to decrease the pH level to a second equivalence point, which occurs at a pH below about 7.0, and above about 5.0. This point is determined by monitoring the rate of decrease of pH per unit of acid. The successive units of acids added initially cause a gradual decrease in pH per unit of acid added. However, when the second equivalence point is approached, a rapid decrease in pH per unit of acid is obtained. Additions of acid sufficient to depress the pH below the second equivalence point are to be avoided since they result in solubilization of other substances, such as iron, etc., present in the slurry solids, and accordingly, prevent a separation of relatively pure magnesium salt from slurry solids.

Upon completion of the solubilization of magnesium hydroxide, the solution is separated from the insolubles remaining.

The magnesium in solution is then recovered therefrom. This can be effected, for example, by precipitating the same, as by first reacting the solution with an alkali metal carbonate, and recovering the magnesium carbonate precipitate. Other methods of recovery are known to those skilled in the art. The carbonate thus recovered from the aqueous solution can be calcined to provide the final desired product, purified magnesium oxide or magnesia.

The process of the desired solubilizations can be readily followed by monitoring the rate of decrease of the pH level per unit of acid as a function of successive additions of acid and can be accurately controlled on the basis of these observations. Accurate knowledge of calcium and magnesium contents of starting materials is not necessary. Once a graph of the pH rate of change per unit of acid added has been made on a slurry of a given starting material utilizing the intended acid reagent, regardless of the concentration of reagent, the process can be carried out accurately and effectively, with acid additions to about the equivalence point.

It will be understood that the present invention can be successfully carried out on a continuous, semi-continuous or batch basis, without difficulty and with effective results.

Now referring to FIGURE 1 of the accompanying drawings, an example of a suitable arrangement of apparatus and sequence of steps for one embodiment of the present process is schematically illustrated therein. Thus, if the starting material does not already comprise the calcium and magnesium in the form of hydroxides, it is converted thereto by sutiable operations, as shown in FIGURE 1. If, for example, the calcium and magnesium are present in the form of carbonates, the starting material may first be passed to a conventional calciner. The starting material, therefore, can be any calcium- and magnesium-containing material (*a*) which contains initially magnesium as the hydroxide with or without calcium hydroxide, or (*b*) which is capable of being converted to calcium hydroxide- and magnesium hydroxide-containing material, as by calcining and slaking. In the usual instance, ground dolomitic material 1, such as Galena dolomite, or float tails from zinc-lead flotation circuits, after removal of marcasite ($FeS_2$), are used. In the example illustrated in FIGURE 1, ground Galena dolomite having the following analysis is calcined:

| | Percent (by weight) |
|---|---|
| Mg | 12.15 |
| Ca | 17.99 |
| $Fe_2O_3$ | 1.08 |
| $CO_2$ | 41.00 |
| Other | 7.81 |

After calcining, the dolomite had the following analysis:

| | Percent (by weight) |
|---|---|
| Mg | 20.60 |
| Ca | 30.50 |
| $Fe_2O_3$ | 1.83 |
| Other | 13.23 |

The calciner, shown at 2 in the drawings, may be a suitable high temperature apparatus of conventional design and operation, such as a fluidized bed or pebble conversion reactor, operating at, for example, about 950°–1000° C. In the calciner 2, conversion of carbonates in one ton of the starting material to oxides is effected by removal of carbon dioxide from the dolomitic material as gas. The carbon dioxide gas may be vented off as a waste gas as shown in FIGURE 1. However, it may, if desired, be sent to a heat exchanger (not shown) and recovered. The calcined material can be stored, as in a bin 3, until ready for use, whereupon it may be passed to a tank 4 containing a mechanical agitator **4*a*** or the like and hydrated to convert the respective oxides to hydroxides, i.e., slaked by mixing the material with suitable concentrations of water to form a slurry. One ton of the calcined dolomite is slaked with three tons of water, i.e., about 720 gallons, as an example.

The next step in the illustrated process is to remove calcium from the insolubles in the slurry while retaining magnesium in the slurry. This can be effected by passing the slurry through a surge tank 5 and into one or more reaction vessels 6, 7 and 8, wherein the slurry is contacted with metered amounts of acid to leach out the calcium. Any suitable acid may be employed which will solubilize calcium but, for practical purposes, the acid will be hydrochloric. Thus, in the example illustrated in FIGURE 1, 610 gallons of 6 N hydrochloric acid is added to the slurry at 75° C. to selectively solubilize the calcium hydroxide, and this amount effects reduction of the pH in the equivalence point range, i.e., 8.6, at which point substantially all calcium hydroxide present is selectively solubilized in the water of the slurry and therefore can be readily removed from contact with the slurry solids.

In accordance with the flow diagram of FIGURE 1, the vessels 6, 7 and 8 are utilized to solubilize portions of the slurry by controlled addition of the acid. Thus, one of the vessels may be undergoing filling while another is effecting solubilizing and while the third is being emptied, in order to carry out a continuous process.

Suitable instruments **9*a*, 9*b* and 9*c* are employed to provide accurate control of the amount of acid contacting the slurry in each reaction vessel and to show the rate of change of pH with addition of acid, so as to allow termination of the reaction when the equivalence point for the reaction has been reached. Thus, for example, a pH meter may be incorporated in each of the three reaction vessels 6, 7 and 8**.

Each pH meter may, if desired, be electrically connected in such a manner to an electrical cut-off valve controlling the flow of acid into the particular reaction vessel so as to actuate closing of a valve when a given pH is reached, i.e., the equivalence point once this pH is established. Alternatively, manually controlled closing of the valve can be provided. Suitable apparatus (not shown) can also be provided for monitoring the rate of change of pH with respect to the rate of increase of amount of acid in each vessel, so that the equivalence point for the reaction can be readily and quickly determined.

In accordance with the method of the present invention, as shown in FIGURE 1, once the calcium hydroxide in a reaction vessel 6, 7 and 8, has been substantially completely dissolved with the acid, without substantial solubilization of the magnesium hydroxide, the slurry in the particular reaction vessel, 6, 7 or 8, is then passed through a surge tank 10, if desired, and to means, such as filter 11, which separates the calcium-containing aqueous solution from the insolubles in the slurry. The calcium-containing solution may be passed, as shown in FIGURE 1, to an evaporator 13 to recover the dry calcium salt, which can then be stored.

In FIGURE 1 is set forth an arrangement for using calcium chloride to prepare fresh hydrochloric acid. Thus, the calcium chloride goes into a storage bin 15 and then to a weighing device 17, and is then reacted in a separate vessel 19 with sulfuric acid to form hydrochloric acid. After filtration in a filter 21, the HCl solution is passed to a still 23, with the distillate going to a reservoir tank 25 for use in acid additions to the reaction vessels 6, 7 and 8. The reservoir tank 25 is also supplied by 37 percent hydrochloric acid from tank 24 which is diluted with water in tank **24*a***.

The still residue is re-cycled in part to the vessel 19 to act as a solvent for the $CaCl_2$ flakes. The $CaSO_4.2H_2O$, gypsum, from filter 21, in part, is washed in washer 27, filtered in filter 29, with the filtrate passing to a slaking reservoir tank 31, and the solids, comprising $$CaSO_4.2H_2O$$

being recovered.

The residue from the filter 11 containing substantially no calcium and containing substantially all of the magnesium originally present in the starting material can be effectively used per se as fire bricking material, or for other purposes. However, it is usually desirable to continue treatment of the residue to separate therefrom substantially all of the magnesium thereof and recover the same as purified magnesia.

The magnesium separation is effected, in the illustrated embodiment, by first washing the insolubles from the filter 11 in a wash tank 33, and then filtering in a filter 35. The washed solids are then introduced into a make-up tank 37, which may include a stirrer, and a second slurry is made. The slurry is passed through a surge tank 39 and treated with acid in one or more reaction vessels 41, 43 or 45, as illustrated in FIGURE 1. The magnesium of the water-insoluble magnesium hydroxide reacts with acid to form a solubilized magnesium salt while retaining the other solids in the slurry in insoluble form. Instrumentation to control the amount of acid passing to each reaction vessel 41, 43 or 45, to monitor the pH and the rate of change of pH, as previously described in connection with the reaction vessels 6, 7 and 8, is provided, as indicated at 47, 49 and 51.

Thus, as illustrated in FIGURE 1, the magnesium hydroxide can be reacted with, for example, 581 gallons of 7 N sulfuric acid solution at 75° C. in reaction vessels 41, 43 and 45, the sulfuric acid passing from a supply tank 53 through a dilution tank 55 and reservoir 57 into the vessels 41, 43 and 45. It will be understood that other acids can also be used to form water-soluble salts with the magnesium.

The procedure for control is the same as that previously described in connection with the calcium hydroxide-acid reaction. The pH of the slurry in each reaction vessel is progressively decreased until the second equivalence point of the magnesium hydroxide-sulfuric acid reaction, i.e., pH 7, is approximated in the case of use of sulfuric acid, and the indicated reaction is brought to substantial completion. This point of completion is determined when a rapid decrease in pH occurs after a relatively slower decrease in pH per unit of acid added to the particular slurry, such acid decrease being monitored by pH meters.

The pH can be taken to about 5 without picking up much impurity into the solution, but at lower pH values, other metals such as iron become soluble and reduce the purity of the end product.

When the second equivalence point has been reached in a reactor vessel 41, 43 or 45, the slurry is passed therefrom to a surge tank 59 and into a filter 61, with the solids passing to a washer 63 and a second filter 65. The filtrate, comprising dissolved magnesium, from the filters 61 and 65 goes to a receiver 67.

The combined solution passes to a precipitator 69 in which the magnesium in the solution is reacted with a suitable compound to provide an insoluble salt such as magnesium carbonate. Such reacting compound is an alkali metal carbonate, preferably sodium carbonate in solution, passing from a make-up tank 71 through holding tank 73. The alkali metal carbonate solution is added to the magnesium solution in an amount sufficient to complete formation of and precipitation of magnesium as carbonate. Thus, the carbonate solution can be added with stirring over a period of fifteen minutes, until the pH of the combined solution is about 9.2.

Thereafter, the precipitate is recovered and washed, by passing it from the precipitator 69, surge tank 75, filter 77 and washer 79. It is refiltered and rewashed, as in filter 81, washer 83, whereupon it is finally filtered in filter 85 and the solids passed to a calciner 87 operating at, for example, about 650° C. for conversion of the magnesium carbonate to high purity magnesium oxide. The calciner may be a fluidized bed reactor or other suitable high temperature apparatus, such as was utilized in the initial calcining operation. The calcining converts the $MgCO_3$ to the desired MgO by removal of $CO_2$ gas. The finished product is then recovered in the bin 89, ready for use. A yield of at least 95 percent theoretical can be obtained, with a purity of about 98–99 percent.

The following example further illustrates certain features of the present invention.

*Example*

Ground galena dolomite having the same analysis as specified in the example of FIGURE 1, is calcined to provide calcined dolomite having the same analysis as specified in the example of FIGURE 1.

Processing of the calcined dolomite proceeds as follows:

A total of 200 grams of the calcined dolomite are combined with 600 ml. of water to form a 25 percent solids slaked slurry containing calcium and magnesium as calcium hydroxide and magnesium hydroxide. 6 N hydrochloric acid is mixed with the slurry at about 75° C. with stirring, the course of the reaction being monitored with a pH meter to an equivalence point of pH 8.6, as determined by a rapid decrease of pH to this value following a slow decrease in pH. The aqueous portion of the slurry is then filtered from the solubles of the slurry and is sent to an evaporator from which is obtained anhydrous calcium chloride.

The residue of the slurry is washed with water and filtered, the solids being made up to 25 percent solids with about 400 ml. of water and mixed with 7 normal sulfuric acid. The acid reaction is monitored with a pH meter and addition of acid is terminated when the pH has been reduced to about 7, i.e., when about 0.484 liter of the acid has been added at about 75° C. In this instance, the second equivalence point at pH 7 is determined by the end of a slow decrease in pH. The solution of the slurry is then removed from the insolubles and contains solubilized magnesium. The common ion effect causes almost all calcium sulfate found in the insolubles to be in the insoluble state.

The insolubles are washed once and the wash water is combined with the first filtrate which is then sent to a precipitator and contacted at about 75° C. with saturated sodium carbonate solution until the pH is 9.2. At that pH, magnesium carbonate precipitates almost quantitatively. The precipitation is carried out for about 15 minutes. The precipitate is separated by filtration, washed twice with water and passed to a calciner operating at about 650° C., where it is converted to magnesium oxide of low bulk density and high purity. The yield is over 95 percent theoretical and the purity exceeds 99 percent.

The process of this invention is efficient, relatively rapid, and does not depend on accurate analysis of the starting materials or reagents.

Accordingly, the process of the present invention has substantial advantages over conventional processes for separating magnesia from magnesium- and calcium-bearing mineral masses. High yields of magnesium oxide of high purity are obtained conveniently with a minimum of process control required. Once the equivalence point for the calcium hydroxide-acid reaction and the equivalence point for the magnesium hydroxide-acid reaction have been established by observation of pH changes per unit of acid added to aqueous slurries containing the mineral materials, subsequent amounts of mineral can be readily processed with accurate control of completion of the desired selective solubilizing reactions for maximum results. It will be understood that the process of the present application can be readily carried out with suitable modifications of process steps, equipment and reagents and that such modifications are within the scope of the present invention.

Various of the features of the present invention are set forth in the appended claims.

What is claimed is:

1. A process for separating magnesium and calcium in a mineral mass containing calcium hydroxide, magnesium hydroxide and magnesium oxide which process comprises forming an aqueous slurry of said calcium hydroxide, magnesium hydroxide and magnesium oxide, decreasing the pH of said slurry by the addition of an acid which forms a soluble calcium compound, determining the point where the rate of change of pH substantially increases, terminating the acid addition at about such point, and separating the aqueous solution of said slurry from the solids of said slurry.

2. A process for separating magnesium in the form of a soluble magnesium compound from a mineral mass containing calcium hydroxide, magnesium hydroxide and magnesium oxide which process comprises forming an aqueous slurry of said calcium hydroxide, magnesium hydroxide, and magnesium oxide, decreasing the pH of said slurry by the addition of an acid which forms a soluble calcium compound, determining the point where the rate of change of pH substantially increases, terminating acid addition at about such point, separating the aqueous solution of said slurry from the solids of said slurry, contacting said solids with water to form a second slurry, decreasing the pH of said second slurry by the addition of an acid which forms a soluble magnesium compound, determining the point where the rate of change of pH substantially increases, terminating acid addition at about such point, and separating the soluble magnesium compound in water solution from the insolubles of said second slurry.

3. A process for recovering purified magnesium oxide from a mineral mass of unknown assay containing calcium hydroxide, magnesium hydroxide and magnesium oxide, which process comprises the steps of forming an aqueous slurry of said calcium hydroxide, magnesium hydroxide and magnesium oxide, decreasing the pH of said slurry with addition of acid which forms a soluble calcium compound, determining the point where the rate of change of pH increases substantially, terminating acid addition at about such point, separating the aqueous solutions of said slurry from the solids of said slurry, contacting said solids with water to form a second slurry, decreasing the pH of the second slurry with addition of acid which forms a soluble magnesium compound, determining the point where the rate of change of pH substantially increases, terminating acid addition at about such point, separating said formed magnesium compound in water solution from the insolubles of said second slurry, reacting said magnesium compound with an alkali metal carbonate to form water-insoluble magnesium carbonate as a precipitate, separating said magnesium carbonate from said solution, calcining said magnesium carbonate and recovering purified magnesium oxide as a final product.

4. A process for recovering purified magnesium oxide from a mineral mass of unknown assay containing calcium carbonate and magnesium carbonate, which process comprises the steps of calcining said mineral mass and slaking said calcined mineral mass to provide an aqueous slurry containing said calcium and magnesium as calcium hydroxide, magnesium hydroxide and magnesium oxide, respectively, selectively reacting the calcium hydroxide in said slurry with a first acid to form a water-soluble compound thereof by introducing into contact with said slurry successive controlled amounts of said first acid sufficient to decrease the pH of said slurry only to about the equivalence point of the acid-calcium hydroxide reaction, monitoring said pH changes and discontinuing said acid addition in response to a first rapid decrease in pH per unit of acid added following a first gradual decrease in pH per unit of acid added, separating the aqueous solution of said slurry from the solids of said slurry, contacting said solids with water to form a second slurry, reacting the magnesium hydroxide of said second slurry with a second acid to form a water-soluble compound by introducing into contact with said slurry successive controlled amounts of said second acid sufficient to decrease the pH of said slurry only to about the equivalence point of the acid-magnesium hydroxide reaction, monitoring said pH changes and discontinuing said acid addition in response to a second rapid decrease in pH per unit of acid added following a second gradual decrease in pH per unit of acid added, separating the magnesium compound in water solution from the insolubles of said second slurry and reacting said magnesium compound in said water solution with an alkali metal carbonate to form a water insoluble magnesium carbonate, separating said formed magnesium carbonate from said solution and calcining said magnesium carbonate to purified magnesium oxide.

5. A process for recovering purified magnesium oxide from a mineral mass of unknown assay containing calcium hydroxide, magnesium hydroxide and magnesium oxide, which process comprises the steps of forming an aqueous slurry of said calcium hydroxide, magnesium hydroxide and magnesium oxide, decreasing the pH of said slurry with hydrochloric acid to form a solubilized calcium chloride, determining the point where the rate of change of pH substantially increases, terminating acid addition at about such point while monitoring said pH decrease, separating the aqueous solution of said slurry from the solids of said slurry, contacting said solids with water to form a second slurry, decreasing the pH of the second slurry with addition of acid which forms a soluble magnesium compound, determining the point where the rate of change of pH substantially increases, terminating acid addition at about such point while monitoring said pH decrease, separating said formed magnesium compound in water solution from the insolubles of said second slurry, reacting said magnesium compound with an alkali metal carbonate to form water-insoluble magnesium carbonate as a precipitate, separating said magnesium carbonate from said solution and calcining said magnesium carbonate to purified magnesium oxide as a final product.

6. A process for recovering purified magnesium oxide from a mineral mass of unknown exact assay containing calcium hydroxide and magnesium hydroxide, which process comprises the steps of forming an aqueous slurry of said calcium hydroxide and magnesium hydroxide, selectively reacting said calcium hydroxide in said slurry with hydrochloric acid to form water soluble calcium chloride by monitoring pH changes in said slurry while introducing into contact with said slurry successive controlled amounts of hydrochloric acid sufficient to decrease the pH of said slurry only to about the equivalence point of the hydrochloric acid-calcium hydroxide reaction, separating the aqueous solution of said slurry containing calcium chloride from the solids of said slurry, contacting said solids with water to form a second slurry, reacting the magnesium hydroxide of said second slurry with sulfuric acid to form a water soluble compound, monitoring pH changes in said second slurry while introducing into contact with said slurry successive controlled amounts of said acid sufficient to decrease the pH of said slurry only to about the equivalence point of the sulfuric acid-magnesium hydroxide reaction, separating the formed magnesium sulfate in water solution from the insolubles of said second slurry, reacting the magnesium sulfate with an alkali metal carbonate to form water-insoluble magnesium carbonate as a precipitate, separating said magnesium carbonate and calcining said magnesium carbonate to purified magnesium oxide as a final product.

7. A process for recovering purified magnesium oxide from a dolomitic mineral mass of unknown exact assay containing calcium carbonate and magnesium carbonate, which process comprises the steps of calcining said mineral mass and slaking said calcined mineral mass to provide an aqueous slurry containing said calcium and magnesium as calcium hydroxide, magnesium hydroxide and magnesium oxide, respectively, selectively reacting the calcium hydroxide in said slurry with hydrochloric acid to form a water-soluble compound by introducing into contact with said slurry successive controlled amounts of said acid sufficient to decrease the pH of said slurry to within a first pH range of about 8.6 to about 10, monitoring said pH changes and discontinuing said acid addition within said first pH range in response to a first rapid decrease in pH per unit of acid added following a first gradual decrease in pH per unit of acid added, separating the aqueous solution containing calcium chloride from the solids of said slurry, contacting said solids with water to form a second slurry, reacting the magnesium hydroxide and magnesium oxide of said second slurry with sulfuric acid to form water-soluble magnesium sulfate by introducing into contact with said slurry successive controlled amounts of said sulfuric acid sufficient to decrease the pH of said slurry to within a second pH range of about 5 to about 7, monitoring said pH changes and discontinuing said acid addition within said second pH range in response to a second rapid decrease in pH per unit of acid added succeeding a second gradual decrease in pH per unit of acid added, separating the magnesium compound in water solution from the insolubles of said second slurry and reacting said magnesium compound in said water solution with an alkali metal carbonate to form a water insoluble magnesium carbonate, separating said formed mgnesium carbonate from said solution and calcining said magnesium carbonate to purified magnesium oxide.

8. A process for recovering magnesium hydroxide from a mineral mass of unknown assay containing both calcium hydroxide and magnesium hydroxide, which process comprises the steps of forming an aqueous slurry of said calcium hydroxide and magnesium hydroxide, decreasing the pH of said slurry with hydrochloric acid to form a solubilized calcium chloride, determining the point where the rate of change of pH substantially increases, terminating said acid addition at about such point while monitoring said pH decrease, separating said solubilized calcium chloride from the solids of said slurry containing said magnesium hydroxide, evaporating said aqueous solution to recover said calcium chloride, and reacting said calcium chloride with sulphuric acid to form hydrochloric acid.

References Cited in the file of this patent

UNITED STATES PATENTS

| | | |
|---|---|---|
| 539,889 | D'Andria | May 28, 1895 |
| 2,398,493 | Butt et al. | Apr. 16, 1946 |
| 2,473,534 | Lloyd | June 21, 1949 |
| 2,587,001 | Seailles | Feb. 26, 1952 |

OTHER REFERENCES

Mellor: "A Comprehensive Treatise on Inorganic and Theoretical Chemistry," vol. 4, Longmans Green and Co. (1923), pages 280, 281 and 332.